(12) United States Patent
Gupta et al.

(10) Patent No.: US 11,394,204 B2
(45) Date of Patent: Jul. 19, 2022

(54) ENHANCED MULTI VOLTAGE DIP RIDE THROUGH FOR RENEWABLE ENERGY POWER PLANT WITH BATTERY STORAGE SYSTEM

(71) Applicant: VESTAS WIND SYSTEMS A/S, Aarhus N (DK)

(72) Inventors: Manoj Gupta, Singapore (SG); Ravi Kumar, Melbourne (AU)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/256,518

(22) PCT Filed: Jun. 3, 2019

(86) PCT No.: PCT/DK2019/050173
§ 371 (c)(1),
(2) Date: Dec. 28, 2020

(87) PCT Pub. No.: WO2020/001716
PCT Pub. Date: Jan. 2, 2020

(65) Prior Publication Data
US 2021/0281070 A1 Sep. 9, 2021

(30) Foreign Application Priority Data
Jun. 26, 2018 (DK) .......................... PA 2018 70439

(51) Int. Cl.
*H02J 3/24* (2006.01)
*H02J 3/00* (2006.01)
*H02J 3/38* (2006.01)

(52) U.S. Cl.
CPC ............ *H02J 3/24* (2013.01); *H02J 3/00125* (2020.01); *H02J 3/381* (2013.01); *H02J 2203/10* (2020.01); *H02J 2300/28* (2020.01)

(58) Field of Classification Search
CPC .......... H02J 3/24; H02J 3/00125; H02J 3/381; H02J 2300/28; H02J 2203/10; H02J 3/50;
(Continued)

(56) References Cited

U.S. PATENT DOCUMENTS

| 2009/0079193 A1 | 3/2009 | Nielsen et al. |
| 2011/0025059 A1 | 2/2011 | Helle et al. |

(Continued)

FOREIGN PATENT DOCUMENTS

| EP | 2668172 A1 | 12/2013 |
| EP | 2688172 A2 | 1/2014 |

(Continued)

OTHER PUBLICATIONS

Danish Patent and Trademark Office 1st Technical Examination of Application No. PA 2018 70439 dated Jan. 17, 2019.
(Continued)

*Primary Examiner* — Richard Tan
(74) *Attorney, Agent, or Firm* — Patterson + Sheridan, LLP (57) ABSTRACT

A method for operating a renewable energy power plant comprising a plurality of renewable energy generators, a plurality of power dissipation systems and a battery storage system is provided. The method comprises steps of: monitoring the statuses of the power dissipation systems; performing a ramped active power recovery operation following a voltage deviation, and controlling the battery storage system during the ramped active power recovery operation to absorb power generated by the renewable energy generators in dependence on the monitored statuses of the power dissipation systems.

14 Claims, 5 Drawing Sheets

(58) Field of Classification Search
CPC ............. H02J 2300/22; H02J 2300/20; H02J 2310/18; H02J 7/34; H02J 3/001
USPC ........................................................ 307/102
See application file for complete search history.

(56) References Cited

U.S. PATENT DOCUMENTS

| | | |
|---|---|---|
| 2012/0217824 A1 | 8/2012 | Gupta et al. |
| 2015/0145251 A1 | 5/2015 | Wagoner et al. |
| 2017/0244251 A1 | 8/2017 | Nielsen et al. |
| 2017/0331295 A1 | 11/2017 | Abeyasekera et al. |
| 2018/0283351 A1* | 10/2018 | Muszynski ............ H02M 5/458 |

FOREIGN PATENT DOCUMENTS

| | | |
|---|---|---|
| EP | 2955809 A2 | 12/2015 |
| WO | 2017045698 A1 | 3/2017 |
| WO | 2018054469 A1 | 3/2018 |
| WO | 2020001716 A1 | 1/2020 |

OTHER PUBLICATIONS

PCT Notification of the Transmittal of the International Search Report and the Written Opinion of the International Searching Authority or the Declaration for Application No. PCT/DK2019/050173 dated Aug. 13, 2019.

* cited by examiner

ENHANCED MULTI VOLTAGE DIP RIDE THROUGH FOR RENEWABLE ENERGY POWER PLANT WITH BATTERY STORAGE SYSTEM

TECHNICAL FIELD

The present disclosure relates to a control method for enhancing the performance of renewable energy power plants, especially wind power plants in weak grid environments.

BACKGROUND

Wind power plants (WPPs), as well as other renewable energy power plants, are expected to conform to particular requirements of the power network or external grid to which they are connected. One of these requirements is the requirement to remain connected to the grid during multiple or recurring grid faults such as voltage dips, and to support the recovery of voltage levels back to pre-fault levels by supplying sustained active power.

During a voltage dip, active power falls, and so must be ramped back up to pre-fault levels after the grid recovers from the fault. In some cases it is possible to ramp active power back up to pre-fault levels relatively quickly without producing any adverse effects on the grid. However, in some cases, especially where a weak grid interconnection exists (for example a connection in which the short circuit ratio at the relevant bus is below 3), even relatively small changes in active power output can result in instability and undesirable voltage oscillations. WPPs should therefore ideally be capable of ramping active power back up to pre-fault levels in a sufficiently slow and controlled manner to avoid causing instability and voltage oscillations.

One possible solution is to control the ramping up of active power by operating power dissipation systems or resistor systems known as chopper circuits at the wind turbine generators (WTGs) to dissipate power generated by the WTG until active power has returned to pre-fault levels. However, if a WPP experiences multiple voltage dips in a short space of time then it is possible for the chopper circuits to be overloaded. When one or more of the chopper circuits is overloaded it may no longer be possible to keep all of the WTGs connected while still achieving the desired active power recovery ramp rate.

It is an object of the present invention to overcome disadvantages associated with existing renewable energy power plants, and in particular to increase the ability of WPPs to perform slow active power recovery during multiple grid faults, particularly in weak grid situations.

SUMMARY OF THE INVENTION

According to an aspect of the present invention there is provided a method for operating a renewable energy power plant, the renewable energy power plant comprising a plurality of renewable energy generators configured to supply power to an external grid, a plurality of power dissipation systems operable to dissipate power generated by the renewable energy generators, and a battery storage system operable to absorb power generated by the renewable energy generators; the method comprising steps of: monitoring the statuses of the power dissipation systems; performing a ramped active power recovery operation following a voltage deviation, and controlling the battery storage system during the ramped active power recovery operation to absorb power generated by the renewable energy generators in dependence on the monitored statuses of the power dissipation systems.

The renewable energy generators may be wind turbine generators. However, in some cases one or more of the renewable energy generators may be generators of a different type, for example solar power generators.

The power dissipation systems may be resistor systems, for example chopper circuits, which may be configured to dissipate excess energy as heat. Each renewable energy generator may be provided with its own individual power dissipation system, which may be provided in a power converter system of the renewable energy generator. However, in some cases a single power dissipation system may be configured to dissipate power generated by two or more renewable energy generators. Each power dissipation system may include one or more chopper resistors, and one or more semiconductor switches for controlling operation of the chopper resistors.

The battery storage system may be connected to each of the renewable energy generators, for example via a local grid of the renewable energy power plant, and may be operable to absorb power generated by each of the renewable energy generators.

The step of monitoring the statuses of the power dissipation systems may comprise receiving sensor data related to one or more parameters for each power dissipation system and/or consulting a pre-programmed model and/or a look-up table.

The step of monitoring the statuses of the power dissipation systems may comprise performing a heat and/or energy mapping operation for each power dissipation system, for example based on heat sensor data for each power dissipation system.

The step of monitoring the statuses of the power dissipation systems may comprise determining the thermal capacity of each power dissipation system, that is the capacity of each power dissipation system to absorb energy or power during a subsequent ramped active power recovery operation.

The step of monitoring the statuses of the power dissipation systems may comprise monitoring the capacity of each power dissipation system to participate in a ramped active power recovery operation following a voltage deviation.

The step of monitoring the statuses of the power dissipation systems may comprise monitoring which of the power dissipation systems (and therefore which of the renewable energy generators) are currently available to participate in a ramped active power recovery operation following a voltage deviation.

The step of monitoring the statuses of the power dissipation systems may comprise determining the number of power dissipation systems (and therefore the number of renewable energy generators) that are currently available or unavailable to participate in a ramped active power recovery operation following a voltage deviation.

The step of monitoring the statuses of the power dissipation systems may be performed repeatedly at a timed interval, for example a timed interval of 10 seconds.

The step of controlling the battery storage system during the ramped active power recovery operation may comprise determining a reference level of energy or power to be absorbed by the battery storage system in dependence on the monitored statuses of the power dissipation systems, and operating the battery storage system to absorb power generated by the renewable energy generators in dependence on the determined reference level of energy or power.

The step of controlling the battery storage system during the ramped active power recovery operation may comprise determining a reference level of energy or power to be absorbed by the battery storage system in dependence on the number of power dissipation systems (and therefore the number of renewable energy generators) that are currently available or unavailable to participate in the ramped active power recovery operation, and operating the battery storage system to absorb power generated by the renewable energy generators in dependence on the determined reference level of energy or power.

The step of performing the ramped active power recovery operation may comprise applying a ramp rate for each power dissipation system in dependence on the status of that power dissipation system.

The step of performing the ramped active power recovery operation may comprise, for each power dissipation system, applying a first ramp rate if the power dissipation system is determined to be available to participate in a ramped active power recovery operation, and applying a second ramp rate that is faster than the first ramp rate if the power dissipation system is determined to be unavailable for participation in a ramped active power recovery operation. The first ramp rate may be a ramp rate for slow active power recovery. The first ramp rate may be a single constant ramp rate that is applied to each available power dissipation system, or alternatively a variable ramp rate and/or an adaptive ramp rate that is set individually for each available power dissipation system. The second ramp rate may be a default ramp rate that is significantly faster than the first ramp rate which may be applied in order to minimise the thermal load applied to a power dissipation system during a ramped active power recovery operation.

The method may further comprise a step of monitoring the renewable energy power plant, the external grid and/or a connection between the renewable energy power plant and the external grid in order to detect a predetermined grid condition.

The predetermined grid condition may be a weak grid condition.

The predetermined grid condition may be detected in dependence on the short circuit ratio of the external grid. Alternatively, or in addition, the predetermined grid condition may be detected in dependence one or more of a) differences in phase angle at different points in a power network, b) changes in voltage level at one or more points within the network and c) receipt of a command signal from an external protection system.

The step of monitoring the statuses of the power dissipation systems may be performed only when the predetermined grid condition has been detected.

The step of monitoring the statuses of the power dissipation systems may be ceased when it is determined that the predetermined grid condition no longer applies.

The method may further comprise a step of switching the battery storage system to a fast charging mode when the predetermined grid condition has been detected.

The method may further comprise a step of returning the battery storage system to a normal mode of operation when it is determined that the predetermined grid condition no longer applies.

According to a further aspect of the present invention there is provided a controller configured to control operation of a renewable energy power plant in accordance with the first aspect of the present invention.

According to a further aspect of the present invention there is provided a computer program downloadable from a communications network and/or stored on a machine readable storage medium comprising program code instructions for implementing a method in accordance with the first aspect of the present invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
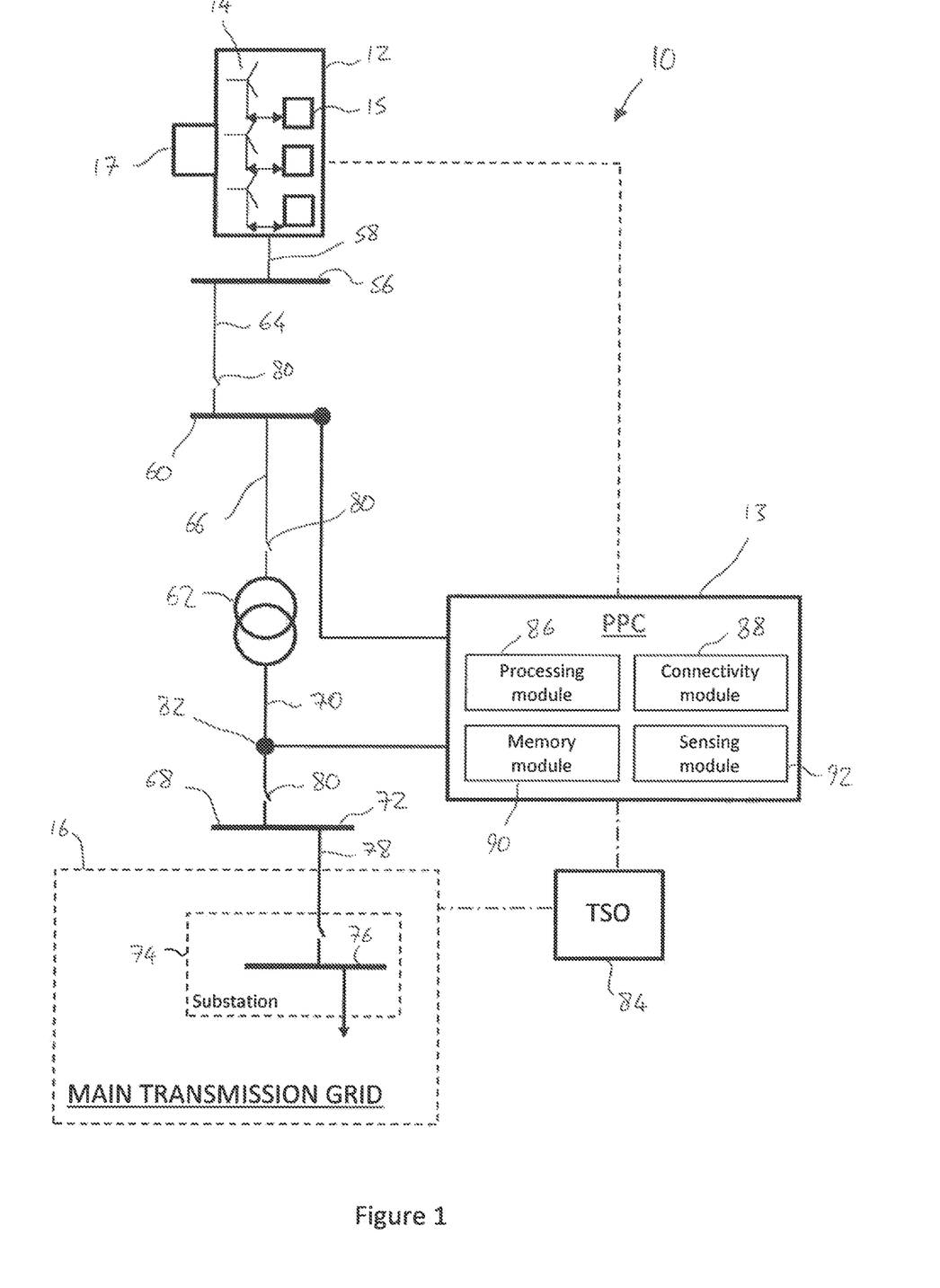
FIG. 1 schematically illustrates a wind power plant, its connection to a main grid, and its control system.
Figure 3:
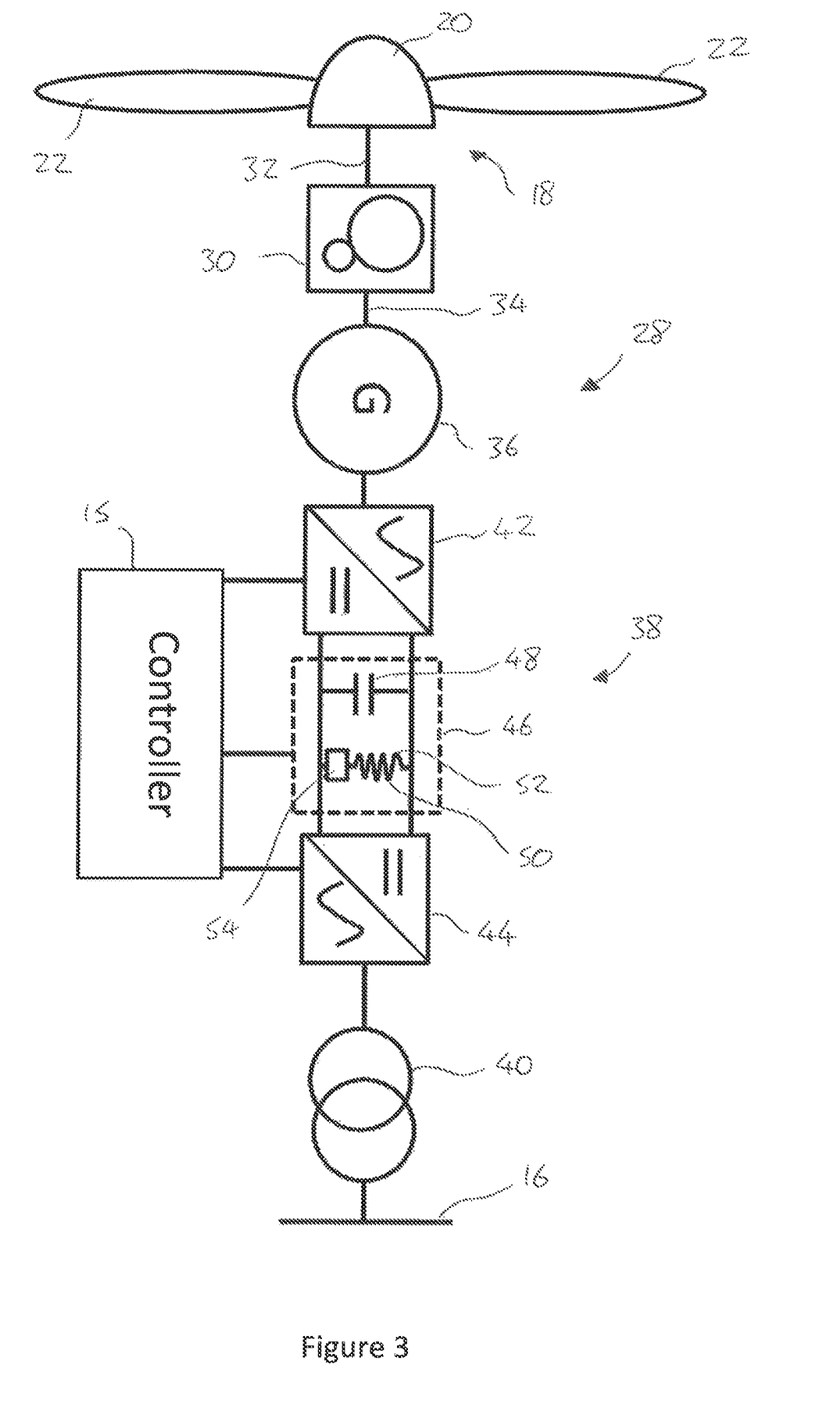
FIG. 3 schematically illustrates the arrangement of the power generation and converter system of the wind turbine generator illustrated in FIG. 2.

FIG. 1 illustrates a wind power plant (WPP) that is connected to a main transmission grid as part of a wider power network. FIG. 3 illustrates a typical architecture for a wind turbine generator (VVTG), or more simply a 'wind turbine'. As will be understood by the skilled reader, a WPP comprises at least one WTG, and is also known as a wind park or a wind farm. The examples shown are representative only and the skilled reader will appreciate that other specific architectures are possible, in relation to both wind power plants, power plants for other renewable energy sources, wind turbine generators and other renewable energy generating sources. Thus, the invention also relates to renewable energy power plants and renewable energy generators in general, rather than being specific to wind power plants and generators as in the Figures. In addition, the skilled reader will appreciate that methods, systems and techniques also described below may be applicable to many different configurations of power network. It is expected that other known components may be incorporated in addition to or as alternatives to the components shown and described in FIGS. 1 and 3. Such changes would be within the capabilities of the skilled person.

FIG. 1 shows a power network 10 incorporating a WPP 12. The WPP 12 includes a plurality of WTGs 14 that are connected together by a local grid. Each of the plurality of WTGs 14 converts wind energy into electrical energy, which is transferred from the WTGs 14 to a main transmission network or main grid 16, as active current, for distribution.

Each of the WTGs 14 is associated with a respective WTG controller 15. In some embodiments, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current requests received from a power plant controller (PPC) 13. During extraordinary conditions, the WTG controllers 15 operate to fulfil predetermined network requirements, and also act to protect the WTGs 14 from any potentially harmful conditions.

Figure 2:
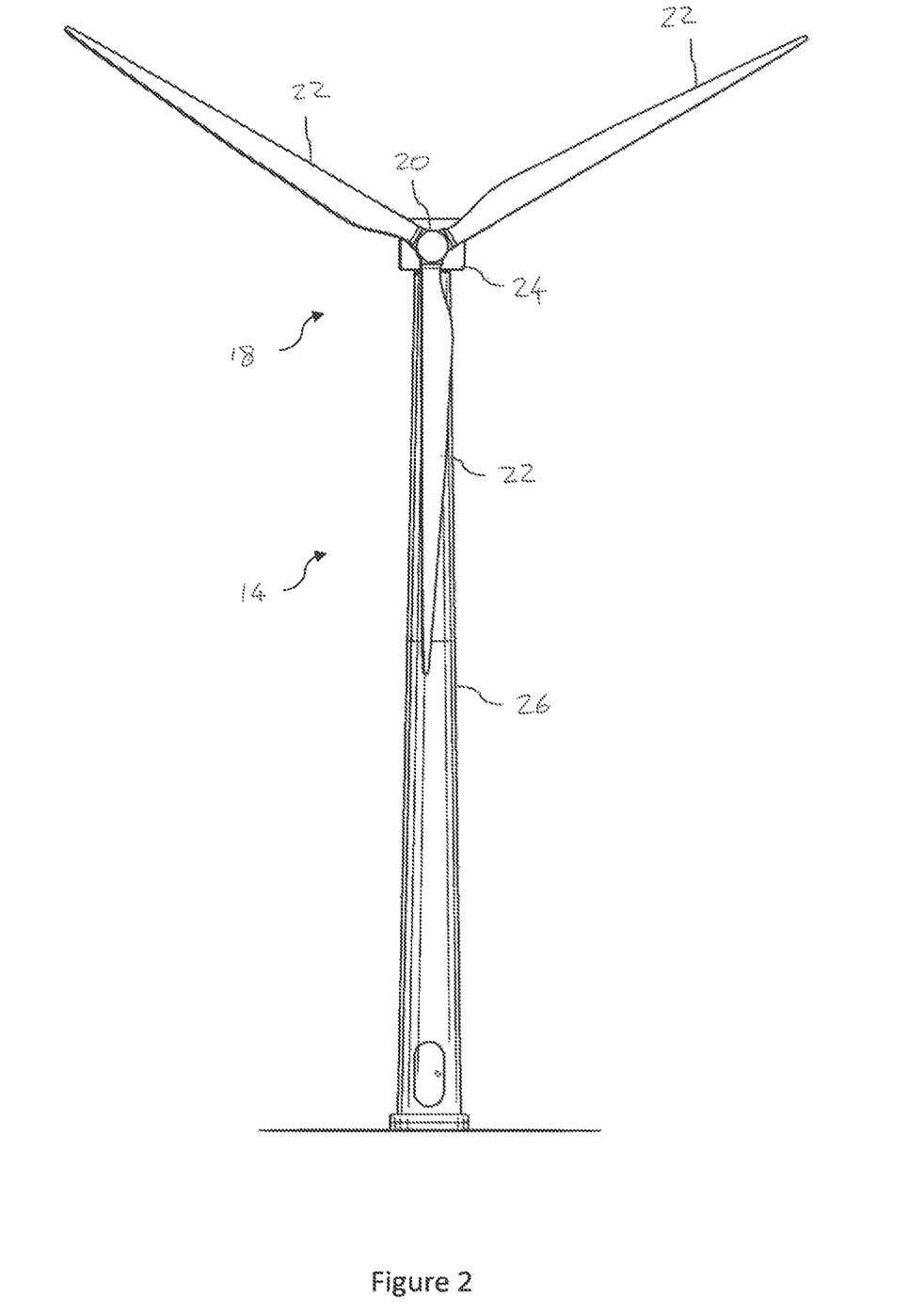
FIG. 2 schematically illustrates a front view of a wind turbine generator of the wind power plant illustrated in FIG. 1.

A typical WTG 14 is shown in FIG. 2, while a typical WTG architecture 28 with an associated controller 15 is shown in FIG. 3. The WTG 14 comprises a rotor 18 including a hub 20 to which three blades 22 are attached. The rotor 18 is rotatably supported by a nacelle 24 that is mounted to the top of a tower 26 in the usual manner.

The nacelle 24 houses and supports various power generating components of the WTG 14, as will be described with reference to FIG. 3. As is known, a flow of wind acting on the blades 22 spins the rotor 18, which drives the power generation equipment housed in the nacelle 24.

The WTG 14 illustrated in FIG. 2 is an onshore WTG, although the invention may equally be applied to an offshore WTG. Here, the WTG 14 is a horizontal axis wind turbine (HAWT) having three blades, which is a common type of system, although other types having different numbers of blades exist to which the invention is also applicable.

FIG. 3 illustrates the system architecture 28 of the WTG 14 of FIG. 2. In the WTG 14 of FIG. 2, the rotor 18 drives a transmission 30 by way of an input drive shaft 32. Although the transmission 30 is shown here in the form of a gearbox, it is also known for WTGs to have direct-drive architectures which do not include a gearbox. The transmission 30 has an output shaft 34 which drives an electrical generator 36 for generating three-phase electrical power. In this way, the rotor 18 drives the electrical generator 36 through the transmission 30.

The generator 36 is connected to a power converter 38 by a suitable three-phase electrical connector such as a cable or bus. The power converter 38 converts the output frequency of the generator 36 to a frequency that is suitable for supplying to the main grid 16. The output of the power converter 38 is transmitted to the grid 16 through a transformer 40. Operation of the power converter 38 is controlled by the WTG controller 15.

The power converter 38 includes a generator-side (or 'machine-side') AC-DC converter 42, and a line-side (or 'grid-side') DC-AC converter 44, which are coupled in series by a DC link 46, depicted in FIG. 3 by the dashed box. The DC link 46 comprises a smoothing capacitor 48 and a power dissipation system or resistor system 50, also known as a chopper circuit. The smoothing capacitor 48 operates to smooth the DC output, while the chopper circuit 50 acts as a dump load to enable excess energy to be dissipated. The chopper circuit 50 incorporates a switched resistor, comprising a resistor 52, often called a 'chopper resistor', and a semiconductor switch 54. By operating the switch 54 to include the chopper resistor 52 in the circuit 50, the output of active power from the WTG 14 can be regulated, and limited as required. Semiconductor switching devices achieve regulation of the active power output by switching between 'on' and 'off' states at high frequency and at a particular duty cycle to produce an intended output. For example, using a duty cycle of 50% will result in output active power that is half of the output power from the generator-side converter being dissipated by the chopper resistor 52. Suitable switching devices for this purpose include integrated gate bipolar transistors (IGBTs) or metal-oxide-semiconductor field-effect transistors (MOSFETs). The operation of chopper resistors, also known as 'dump loads', would be well known to skilled persons within this technical area and so further discussion of such devices will not be included here for the sake of clarity. For example, chopper resistors are discussed in detail in 'Wind Turbines' by Erich Hau, published 2006. In particular Chapter 10.4 discusses their operation.

However, the dissipation of large amounts of excess energy by the chopper resistor 52 may cause increases in temperature that the chopper resistor 52 is unable to cope with, and so consideration of the capacity of the chopper resistor 52 is particularly important.

Returning to FIG. 1 the WPP 12 is provided with a battery storage system or BSS 17 which is connected to the WTGs 14 via the local grid of the WPP 12. The BSS 17 is operable to absorb active power generated by the WTGs 14, and also to supply power to the main grid 16. Operation of the BSS 17 may be controlled directly by the PPC 13, or alternatively by a separate control system provided at the WPP 12. For simplicity the BSS 17 is represented by a single box at a single location at the WPP 12 in FIG. 1. However, it will be appreciated that the BSS 17 may in some cases comprise a plurality of battery storage modules at a plurality of separate locations, and may be provided at any suitable location within the WPP 12 and/or between the WPP 12 and the main grid 16.

As described above, each of the WTGs 14 of the WPP 12 is connected to a local grid that links the WTGs 14. The WPP 12 is, in turn, suitably connected to a collector bus 56 via a feeder line 58. The collector bus 56 may be at a voltage level that is suitable for relatively short distance power transmission, for example in the region of 10 kV to 150 kV, most usually between 110 kV and 150 kV. The collector bus 56 may also provide a point of common coupling (PCC) for a plurality of wind power plants, although, only a single WPP 12 is shown here for simplicity.

The collector bus 56 is connected to a medium voltage bus 60, which in turn is connected to a main step-up transformer 62. The collector bus 56, medium voltage bus 60 and main step-up transformer 62 are connected by transmission lines 64, 66. The main transformer 62 is in turn connected to the main grid 16 at a Point of Interconnection (PoI) 68 by another transmission line 70. The PoI 68 is an interface between the WPP 12 and the main grid 16 and comprises a PoI bus 72 whose nominal voltage level is higher than that of the collector and medium voltage buses 56, 60.

While the collector and medium voltage buses 56, 60 may be required to span distances up to around 100 km, the main grid 16 and PoI bus 72 may be an international, national, or regional grid such as the National Grid of Great Britain, for example, and therefore may be required to span distances of up to around 250 km or more. Accordingly, the voltage level of the main grid 16 and the PoI bus 72 may be much higher than the voltage level of the collector and the medium voltage buses 56, 60 for better transmission efficiency. As such, the main transmission grid 16 may comprise a plurality of substations and additional buses operating at different voltages as well as further transformers to increase the voltage for improved transfer of power. The transmission grid 16 shown in FIG. 1 includes at least one substation 74 and an associated feeder bus 76, connected to the PoI bus 72 by a transmission line 78.

The connecting lines such as the transmission and feeder lines 58, 64, 66, 70, 78 may each include a protection system 80 to protect individual components from damage during or following extreme conditions. For example, it is envisaged that at least an appropriate circuit breaker module or system will be included in each line.

Hereinafter, it should be assumed that references to components being connected or connections between components comprise suitable feeder or transmission lines as described above unless it is otherwise indicated.

A Power Plant Controller (PPC) 13 is connected to the power network at a Point of Measurement (PoM) 82 and is also connected directly to the WPP 12. The role of the PPC 13 is to act as a command and control interface between the WPP 12 and the grid 16, and more specifically, between the WPP 12 and a grid operator or transmission system operator (TSO) 84. The PPC 13 is a suitable computer system for carrying out the controls and commands as described above and so incorporates a processing module 86, a connectivity module 88, a memory module 90 and a sensing module 92. The PPC 13 may also receive information regarding the grid 16 and/or the local buses, substations and networks from an energy management system (not shown).

The PPC 13 is connected to the transmission line 70 between the main transformer 62 and the PoI bus 72 at the PoM 82 to allow monitoring and regulation of the output of the WPP 12 and to interpret the power demands correctly. The PPC 13 is also connected to the medium voltage bus 60 to measure a variety of parameters that are representative of the state of the grid 16 and WPP 12, and that can be used to improve the outputs of the WPP 12 to best meet the requirements of the ISO 84 or as set out in a set of grid-specific requirements.

The PPC 13 is equipped to measure a variety of parameters including a representative power output that will be supplied to the main grid at the PoI 68 by the WPP 12. As the PoM 82 is not at the PoI 68, the measured parameters are only representative as losses in the lines between the PoM 82 and PoI 68, and between the PoM 82 and the PPC 13, may have an effect on the measurements. Suitable compensation may take place to account for the losses to ensure that the measurements are accurate.

The PPC 13 measures parameters of the power output such as reactive and active power exchange between the WPP 12 and the main grid 16, and the voltage level of the main grid 16. The PPC 13 compares the measured parameters against specific grid requirements and, in a suitable manner, communicates control commands to specific components of the WPP 12 accordingly. The WPP 12 is capable of altering its power or voltage output in reaction to commands received from the PPC 13. It will be noted that FIG. 1 is a schematic view, so the way in which the control commands are transferred is not depicted explicitly. However, it will be appreciated that suitable cabling may be provided to interconnect the PPC 13 to the WTGs 14 or WTG controllers 15 and to the BSS 17. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

As discussed above, the PPC 13 manages the WPP 12 according to a set of grid requirements that are specific to the main grid 16. Specific circumstances require different modes of operation. In particular, the operation of the PPC 13 and WPP 12 in reaction to a grid fault is especially important and requires careful control of voltage and power outputs to support the grid 16, and enable an efficient and safe recovery to normal operating levels.

As will be understood by the skilled person, a grid fault, also known as a voltage deviation or excursion, is generally defined as a period in which the voltage level of the grid 16 or wider power network drops to a level outside the accepted and normal operational bounds. During a grid fault, the PPC 13 operates the WPP 12 in a low-voltage ride through (LVRT) mode to avoid disconnection of the WPP 12 from the grid and to support the grid 16 through the fault. In the LVRT mode, the PPC 13 and WPP 12 support the grid 16 during the fault by supplying reactive power to encourage a rise in voltage levels. The WPP 12 is required to supply reactive power until the voltage levels have returned to levels that are within a normal operating band. In many circumstances, this operating band is between voltage levels of 0.9 per-unit (pu) voltage to 1.1 pu voltage.

Per-unit voltage is an expression of the voltage with respect to a base value which is used as a reference. Using a per-unit system allows for normalization of values across transformers and other components that may change the value by an order of magnitude.

WPPs 12 supporting the grid during a grid fault by operating in LVRT mode are also typically required to supply active power at a level that is proportional to voltage level in that LVRT mode. As voltage has dropped during a fault, the WPP 12 is operated to reduce active power output accordingly. This is generally enabled by the chopper circuits 50, which permits the almost immediate 'dumping' of active power as heat energy through the resistors 52. The amount of active power dissipated in the chopper circuits 50 can be controlled by changing the duty cycle of the switch 54.

Thus, during a grid fault, active power levels are dropped to a lower level than their operational, pre-fault levels. Once the voltage level has recovered to within its normal operational bounds (0.9 pu voltage to 1.1 pu voltage), the WPP 12, and therefore each WTG 14, is required to 'recover' its active power and reactive power levels back to operable levels by increasing or decreasing their output of each of active and reactive power as required. In the embodiments discussed in detail below, it is assumed that the operable level to which active power levels return following the fault is the pre-fault level. It will be appreciated that the invention described herein may also be implemented where the operable active power level differs from pre-fault levels following the fault.

Ordinarily, a main grid such as the main grid 16 shown in FIG. 1 operates well within its design limits, and so normal operating conditions of the grid 16 are re-attained following a fault when operating of the WPP 12 according to conventional voltage control methods. The recovery of the grid 16 using voltage control methods is a stable recovery if the grid 16 is operating within its design limits, and the active power level can be returned to operable levels quickly by reducing the duty cycle of the switch 54.

However, where the grid 16 is operating close to or at its design limit, the grid 16 has a low fault level and a 'weak grid interconnection' exists or may occur following a fault. In these circumstances, the supply of voltage and power at the PoI bus 72 is volatile and small exchanges in reactive or active power at the PoI bus 72 may result in large fluctuations of grid voltage. Weak grid interconnections occur most often in remotely located facilities where insufficient infrastructure is provided, resulting in a high likelihood that the design limit will be reached.

Where a weak grid interconnection exists following a fault, changes in the generation capabilities of the grid 16 and the volatility introduced by the weak grid interconnection mean that the recovery must be carefully managed. In particular, the return of active and reactive power to operable levels may provide potentially harmful oscillations in the voltage level of the grid 16 if the rate of change of power level is too high.

Operating the WPP 12 in voltage control mode as would ordinarily be possible with stable grid interconnections would result in a step change or a very fast ramp in active power following recovery of voltage levels following the fault, and, as a weak grid interconnection exists, large oscillations in voltage level of the grid 16 which are likely to trigger fault protection systems in the WPP 12.

Therefore, it is desirable to operate the WPP 12 to output active power so that the ramp from the fault active power level to the post-fault active power level is much slower than the rate of increase under voltage control mode. However, slowly increasing the active power level requires increased energy to be dissipated by the chopper circuits 50, and therefore an increased heating effect in the chopper resistors 52. In some cases operating the chopper circuits 50 to achieve a slow rate of active power recovery may result in one or more of the chopper circuits 50 being overloaded and overheating, especially if the WPP 12 is required to ride through multiple voltage deviations before the chopper circuits 50 have had sufficient time to cool and recover.

As such, a trade-off is required between the requirement to implement a slow ramp rate to preserve stability of grid voltage levels where a weak grid interconnection exists and the thermal capacity of the chopper resistor 52 to implement the slow ramp of active power levels.

Figure 4:
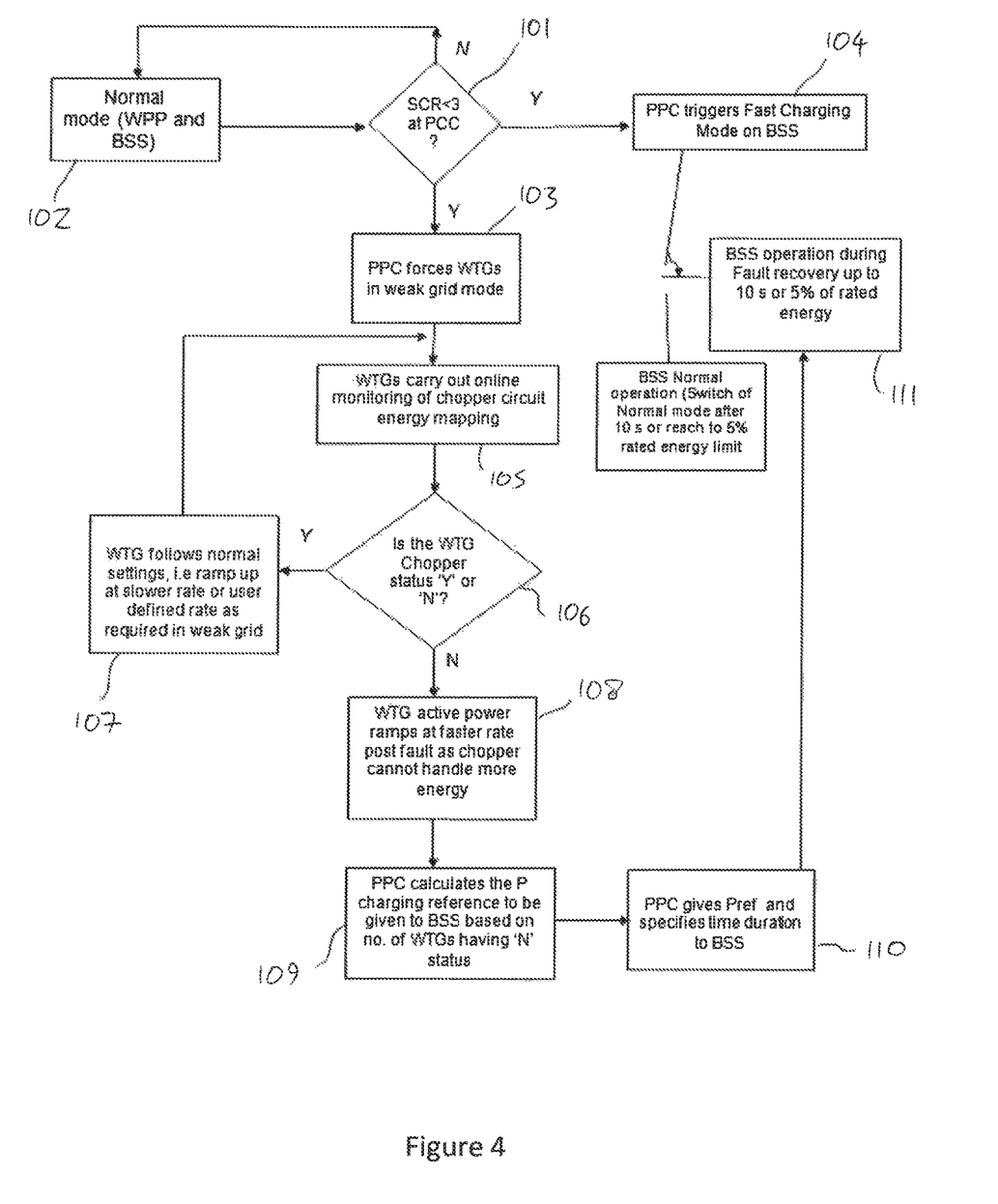
FIG. 4 illustrates method steps for operating the wind power plant of FIG. 1 in accordance with one possible embodiment of the present invention.

In order to solve this problem, the WPP 12 and the PPC 13 are configured to control the BSS 17 to absorb active power generated by the WTGs 14 during a ramped active power recovery operation following a voltage deviation in accordance with one possible embodiment of the present invention, as illustrated in FIG. 4.

As shown in FIG. 4, in an initial step 101 the PPC 13 receives information related to the WPP 12, the main grid 16 and the connection between the WPP 12 and the main grid 16, from which it is determined whether or not a weak grid interconnection exists.

For example, the PPC 13 may be configured to determine the short circuit ratio (SCR) associated with the PoI 72 and to determine that a weak grid interconnection exists if the SCR is less than a threshold value, for example 3, as illustrated in FIG. 4.

If no weak grid interconnection is detected then the method proceeds to step 102 in which the PPC 13 and the WPP 12 operate in a normal mode of operation. However, if a weak grid interconnection is detected then the PPC 13 switches the WTGs 14 into a weak grid mode of operation in step 103, and also triggers the BSS to enable a fast charging mode of operation different to its normal mode of operation in step 104.

When the weak grid interconnection is detected and the WTGs 14 are switched into the weak grid mode, the controller 15 of each WTG 14 is triggered to monitor the status of its respective chopper circuit 50 in step 105. In particular, each WTG 14 monitors the thermal capacity of its chopper resistor 52, and the capacity of its chopper resistor 52 to absorb energy and participate in a ramped active power recovery operation. Monitoring of the chopper circuits 50 may be performed in dependence on sensor data related to one or more parameters including, for example, temperature and/or temperature distribution, and may include performing a heat and/or energy mapping operation for each chopper resistor 52.

Based on this monitoring, each WTGs 14 is then able to assign a status to itself and its chopper circuit 50, for example "Yes, available to participate in slow active power recovery" or "No, not available to participate in slow active power recovery" in step 106. The status of each WTG 14 and its chopper circuit 50 is then fed back to the PPC 13, such that the PPC 13 is able to maintain a record of which WTGs 14 and their chopper circuits 50 are currently available and which WTGs 14 and their chopper circuits 50 are not currently available to participate in slow active power recovery.

The steps of monitoring the status of each WTG 14 and its chopper circuit 50 and providing an indication of the status of each WTG 14 and its chopper circuit 50 to the PPC 13 may be performed repeatedly, for example at intervals of 10 seconds, in order to provide an up-to-date record of the availability of each WTG 14 and its chopper circuit 50 to participate in slow active power recovery.

If a subsequent voltage deviation occurs resulting in a voltage dip from which the WPP 12 is required to recover, the WTG controllers 15 are configured to operate the chopper circuits 50 to participate in a slow active power recovery operation in dependence on their availability status. For example, a slow active power recovery ramp rate can be applied to the WTGs 14/chopper circuits 50 that are currently known to be available to participate in slow active power recovery (step 107) in order to control the rate at which active power is increased. In contrast, for the WTGs 14/chopper circuits 50 that are currently listed as being unavailable to participate in slow active power recovery, a faster ramp rate can be applied (step 108) in order to avoid overloading those chopper circuits 50.

Figure 5:
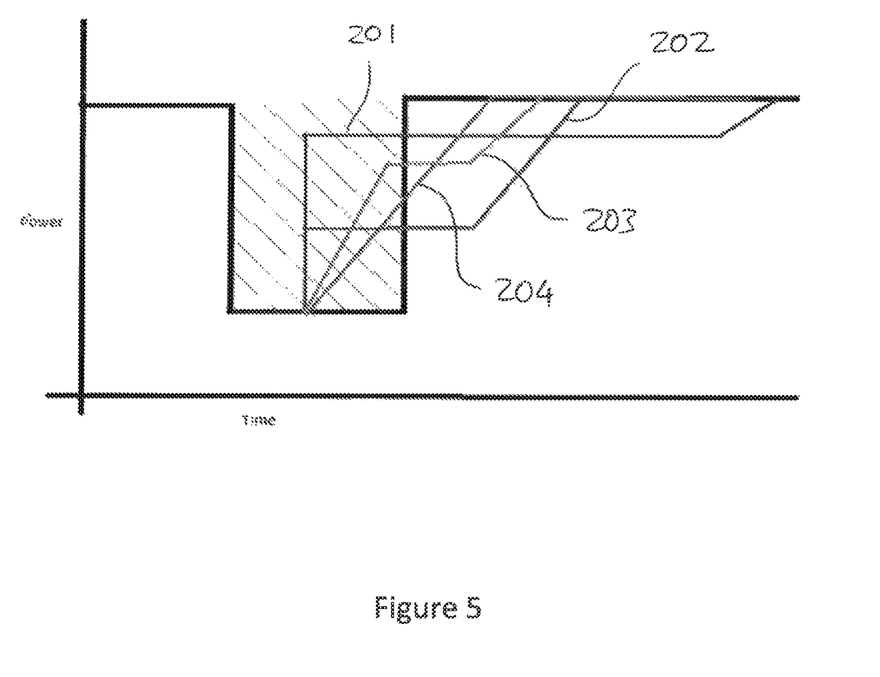
FIG. 5 shows a graph illustrating various examples of active power ramp profiles which may be implemented during a ramped active power recovery operation following a voltage deviation.

The slow active power recovery ramp rate may be a single constant ramp rate that is applied to each available chopper circuit 50. Alternatively the slow active power recovery ramp rate may be a variable ramp rate and/or may be an adaptive ramp rate that is set individually for each available chopper circuit in dependence on the thermal capacity of each chopper circuit. Similarly the faster ramp rate applied for unavailable chopper circuits 50 may be a single constant ramp rate or alternatively a variable and/or adaptive ramp rate. Examples of various possible active power ramp profiles are illustrated at 201 to 204 in FIG. 5.

The operation of some of the chopper circuits 50 at a faster ramp rate results in less power being dissipated by the chopper circuits 50 collectively. However, as described above, the PPC 13 has visibility of the number of WTGs 14/chopper circuits 50 that are currently available and the number of WTGs 14/chopper circuits 50 that are currently unavailable to participate in slow active power recovery. Based on the number of WTGs 14/chopper circuits 50 that are currently available or unavailable, the PPC 13 is configured to calculate a reference level of power and/or energy to absorbed by the BSS 17 in step 109, and to communicate this reference level to the BSS 17 in step 110. The BSS 17 is then operated in step 111 to absorb energy in its fast charging mode of operation in dependence on the reference level communicated from the PPC 13.

In this way the WPP 12 and the PPC 13 are able to maintain the ability of the WPP 12 to ride through multiple voltage dips even if some of the WTGs 14 and their chopper circuits 50 cannot participate in the slow active power ramp rate, and the WPP 12 is able to ramp active power up at a desired slow ramp rate notwithstanding the fact that some of the WTGs 14 are operated at a faster ramp rate in order to avoid overloading of their chopper circuits 50. The reference level of power and/or energy to be absorbed by the BSS 17 may in some cases be set such that the overall rate of active power recovery is the same as that which would be experienced if all of the WTGs 14 were operating at the slow active power recovery ramp rate.

If further voltage deviations occur then the method steps described above may be repeated in order to control the rate of active power recovery, with the number of WTGs 14/chopper circuits 50 used for slow active power recovery and the reference level of power and/or energy to be absorbed by the BSS 17 being updated in dependence on the continuously monitored statuses of the chopper circuits 50. Conversely, if no further voltage deviations occur and the PPC 13 subsequently determines that the weak grid interconnection no longer exists then the WTGs 14 may be returned from the weak grid mode to their normal mode of operation (step 102), and the BSS 17 may be returned from the fast charging mode to its normal mode of operation. After the fault has cleared and grid voltage has stabilised the BSS 17 may be operated to discharge the energy absorbed during the above described fault recovery process.

In the above-described embodiment the weak grid interconnection is detected in dependence on the SCR associated with the PoI 72. The SCR may, for example, be determined in real time at the medium voltage bus 60 by measuring the voltage level change for a given reactive power change and establishing the ratio of the reactive power change to the voltage level change. However, it will be appreciated by those skilled in the art that a weak grid interconnection may also be determined in various other ways. For example, the PPC 13 may alternatively, or in addition, be configured to detect a weak grid interconnection (and activate the above-described weak grid mode) in dependence on measured differences in phase angle at different points within the network 10, in dependence on changes in voltage level at one or more points within the network 10, and/or in dependence on receipt of a command signal from an external protection system.

The above-described example relates to one possible embodiment of the present invention. However, many modifications may be made to the above example without departing from the scope of the present invention as defined in the accompanying claims, as will be appreciated by those skilled in the art.

The invention claimed is:

1. A method for operating a renewable energy power plant, the renewable energy power plant comprising a plurality of renewable energy generators configured to supply power to an external grid, a plurality of power dissipation systems operable to dissipate power generated by the renewable energy generators, and a battery storage system operable to absorb power generated by the renewable energy generators; the method comprising:
monitoring statuses of the power dissipation systems;
performing a ramped active power recovery operation following a voltage deviation,
determining a reference level of energy or power to be absorbed by the battery storage system based on the monitored statuses of the power dissipation systems; and
controlling the battery storage system during the ramped active power recovery operation to absorb power generated by the renewable energy generators based on the determined reference level of energy or power.

2. The method of claim 1, wherein the monitoring the statuses of the power dissipation systems comprises performing a heat or energy mapping operation for each power dissipation system.

3. The method of claim 1, wherein the monitoring the statuses of the power dissipation systems comprises determining the thermal capacity of each power dissipation system.

4. The method of claim 1, wherein the monitoring the statuses of the power dissipation systems comprises monitoring which of the power dissipation systems are currently available to participate in a ramped active power recovery operation following a voltage deviation.

5. The method of claim 1, wherein the monitoring the statuses of the power dissipation systems comprises determining the number of power dissipation systems that are currently available or unavailable to participate in a ramped active power recovery operation following a voltage deviation.

6. The method of claim 1, wherein determining the reference level of energy or power is further based on the number of power dissipation systems that are currently available or unavailable to participate in the ramped active power recovery operation.

7. The method of claim 1, wherein the performing the ramped active power recovery operation comprises applying a ramp rate for each power dissipation system in dependence on the status of that power dissipation system.

8. The method of claim 7, wherein the performing the ramped active power recovery operation comprises, for each power dissipation system, applying a first ramp rate if the power dissipation system is determined to be available to participate in a ramped active power recovery operation, and applying a second ramp rate that is faster than the first ramp rate if the power dissipation system is determined to be unavailable for participation in a ramped active power recovery operation.

9. The method of claim 1, wherein the method further comprises monitoring at least one of the renewable energy power plant, the external grid or a connection between the renewable energy power plant and the external grid in order to detect a predetermined grid condition such as a weak grid condition.

10. The method of claim 9, wherein the predetermined grid condition is detected in dependence on a short circuit ratio of the external grid.

11. The method of claim 9, wherein the monitoring the statuses of the power dissipation systems is performed only when the predetermined grid condition has been detected.

12. The method of claim 9, wherein the method further comprises switching the battery storage system to a fast charging mode when the predetermined grid condition has been detected.

13. A controller, comprising:
a memory;
one or more processors communicatively coupled to the memory and configured to perform an operation to control a renewable energy power plant comprising a plurality of renewable energy generators configured to supply power to an external grid, a plurality of power dissipation systems operable to dissipate power generated by the renewable energy generators, and a battery storage system operable to absorb power generated by the renewable energy generators; the operation comprising:
monitoring statuses of the power dissipation systems;
performing a ramped active power recovery operation following a voltage deviation,
determining a reference level of energy or power to be absorbed by the battery storage system based on the monitored statuses of the power dissipation systems; and
controlling the battery storage system during the ramped active power recovery operation to absorb power generated by the renewable energy generators based on the determined reference level of energy or power.

14. A computer program product containing instructions which, when executed by one or more computer processors, performs an operation, to control operation of a renewable energy power plant, the operation to control a renewable energy power plant comprising a plurality of renewable energy generators configured to supply power to an external grid, a plurality of power dissipation systems operable to dissipate power generated by the renewable energy generators, and a battery storage system operable to absorb power generated by the renewable energy generators; the operation comprising:
monitoring statuses of the power dissipation systems;
performing a ramped active power recovery operation following a voltage deviation,
determining a reference level of energy or power to be absorbed by the battery storage system based on the monitored statuses of the power dissipation systems; and
controlling the battery storage system during the ramped active power recovery operation to absorb power generated by the renewable energy generators based on the determined reference level of energy or power.

* * * * *